United States Patent [19]

Scholl

[11] 4,009,974
[45] Mar. 1, 1977

[54] METHOD AND APPARATUS FOR PUMPING VISCOUS MATERIAL

[75] Inventor: Charles H. Scholl, Vermilion, Ohio

[73] Assignee: Nordson Corporation, Amherst, Ohio

[22] Filed: Dec. 15, 1975

[21] Appl. No.: 640,555

Related U.S. Application Data

[62] Division of Ser. No. 549,189, Feb. 12, 1975, Pat. No. 3,964,645.

[52] U.S. Cl. .............................. 418/181; 417/900; 418/206; 418/270
[51] Int. Cl.[2] ................... F04C 13/00; F04C 1/14; F04C 15/00
[58] Field of Search .................. 418/181, 206, 270; 417/900; 425/242 R, 247; 222/146 HE, 148, 383

[56] References Cited
UNITED STATES PATENTS

| | | |
|---|---|---|
| 2,544,661 | 3/1951 | Fossa .......................... 222/146 HE |
| 3,531,023 | 9/1970 | Mercer .............................. 222/146 |
| 3,792,801 | 2/1974 | Baker et al. ................. 222/146 HE |
| 3,827,603 | 8/1974 | Reighard et al. ............ 222/146 HE |

Primary Examiner—C. J. Husar
Assistant Examiner—Leonard Smith
Attorney, Agent, or Firm—Wood, Herron & Evans

[57] ABSTRACT

An apparatus for melting and dispensing thermoplastic material comprising a hopper, a grid melter, a reservoir and a pump. The novelty of this application resides in a novel method and apparatus for forcing molten material into the pump inlet. The infeed is accomplished by a pair of counter-rotating shafts to which the molten material is supplied and from which it is sheared by a pair of inclined surfaces. In the process of being sheared from the counter-rotating shafts the molten material is forced into the pump inlet.

12 Claims, 11 Drawing Figures

METHOD AND APPARATUS FOR PUMPING VISCOUS MATERIAL

This is a division, of application Ser. No. 549,189 filed Feb. 12, 1975 now U.S. Pat. No. 3,964,645.

This invention relates to apparatus for melting and dispensing thermoplastic material and more particularly to an apparatus for melting and dispensing a large volume of thermoplastic adhesive material with minimal degradation of the molten material prior to application by a dispenser. Conventionally, thermoplastic adhesives or so-called "hot melt" adhesives are converted from a solid to a molten state in a tank having heated walls. The melted material is then maintained in a reservoir is sufficient volume to supply one or more applicators or dispensers. If the job or application requires a substantial volume of hot melt adhesives, a large volume of material must be maintained in the molten or melted state to meet that need. That substantial volume usually necessitates a long warm-up or start-up time for the apparatus as well as prolonged exposure of at least some of the molten material to heat and/or oxygen.

Most thermosplastic adhesive materials oxidize, char or degrade when exposed to heat for any length of time and/or when exposed to oxygen for any appreciable length of time. Consequently, it is desirable to minimize the time that an applicator system maintains the melted material in a molten state. Thus requires though a balancing of the melt rate of the system with the application rate of the system. Another factor which enters into the balancing equation is that of balancing the capacity of the pump which moves the molten material from the reservoir to the dispenser. In the case of very viscous materials, the pump capacity can be a limiting factor because of the inability of the material to flow into the pump at the rate at which the system is capable of melting or dispensing it.

It has therefore been one object of this invention to provide a method and apparatus for melting and dispensing thermoplastic materials which includes a melter having a very high melt rate and a pump having a very large throughput of viscous materials, such that a very large volume of molten material may be dispensed from this system while maintaining only a minimal reservoir of material in the molten state.

To accomplish this objective the invention of this application incorporates a novel melter having a higher melt rate when compared to melters of alternate prior art configurations of similar size, and/or of equal energy inputs. Such prior melting systems are exemplified by U.S. Pat. Nos. 3,792,801 and 3,531,023. Of course, melt rate can always be increased by increasing the surface temperature of the melter but in the case of hot melt materials this surface temperature is necessarily limited because exposure to excessive temperature results in charring, degrading and deterioration of the adhesive.

The improved melter which accomplishes these objectives comprises a receptacle in which the bottom wall has a plurality of upstanding protrusions, the uppermost end of each of which is shaped as a truncated cone. These protrusions are arranged in rows and columns within the melter such that the bottom wall of the melter when viewed in top plan looks much like an egg crate in which the upstanding protrusions form rows of pockets for the reception of eggs.

Another aspect of this invention is predicated upon a novel method and apparatus for pumping a high viscosity fluid. This novel method and apparatus comprises a pump having a pair of upstanding exposed counter-roating shafts located adjacent the pump inlet. Molten material is caused to flow into contact with these counter-rotating shafts to which the molten material adheres. It is then removed or scraped from the surfaces of the shafts by inclined scraper surfaces of a hood located above a pump inlet. As the molten material is scraped from the shafts, it is forced by the hood to flow toward and into the pump inlet, thereby effecting a forced infeed into the pump.

Another aspect of this invention is predicated upon the use of the novel melter of this invention as a component or building block of a modular system which comprises a plurality of different manifold blocks, pumps, pump driving motors, and applicators. This modular construction enables the melter to be used in any one of a multiplicity of different operating characteristic systems, depending upon the particular manifold block, pump, drive motor, and dispenser used in the system.

These and other objects and advantages of this invention will be more readily apparent from the following description of the drawings in which:

FIG. 6 is a perspective view of the cap of the gear pump.

Figure 1:
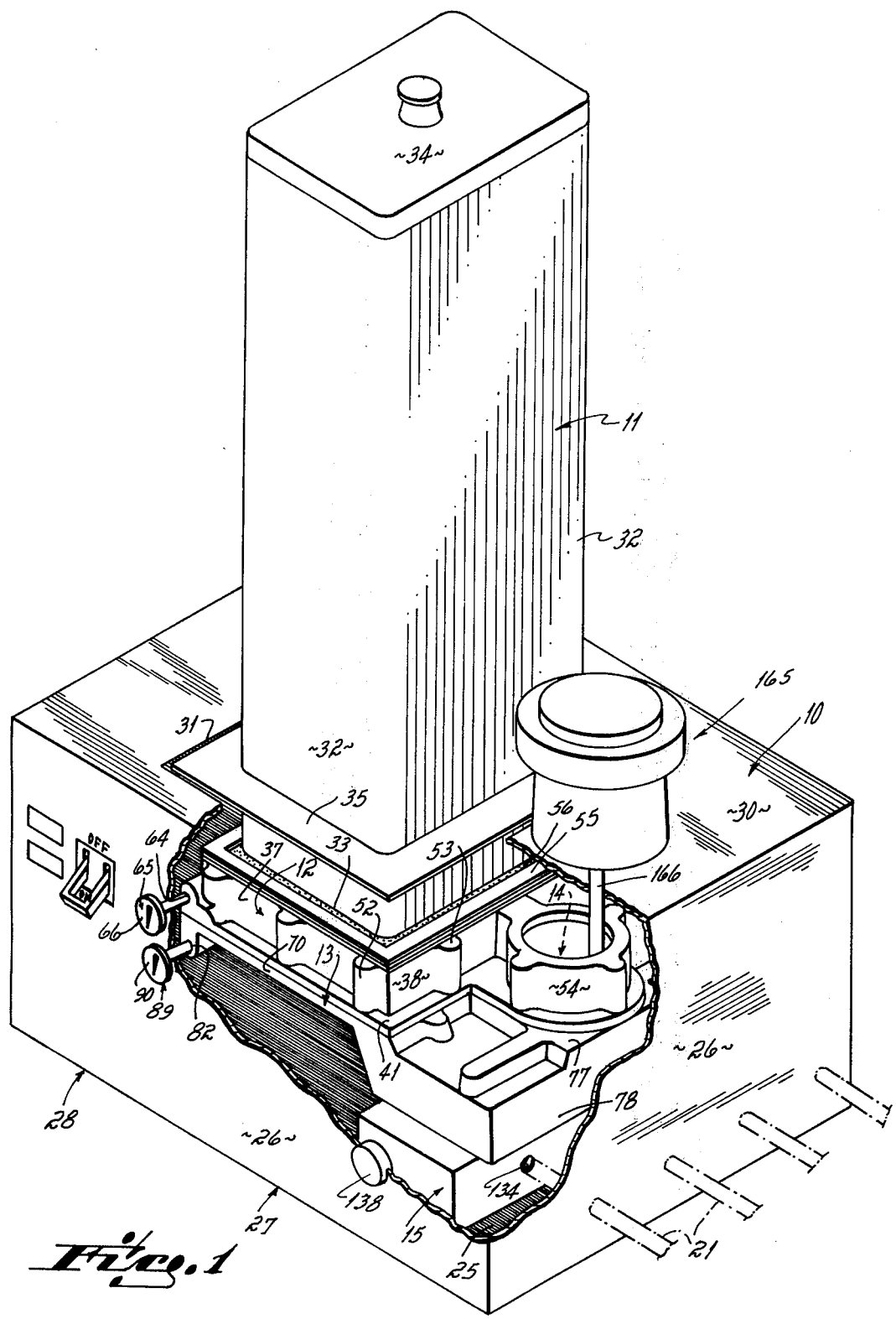
FIG. 1 is a perspective view of one embodiment of a thermoplastic material melting and dispensing apparatus incorporating the invention of this application.
Figure 2:
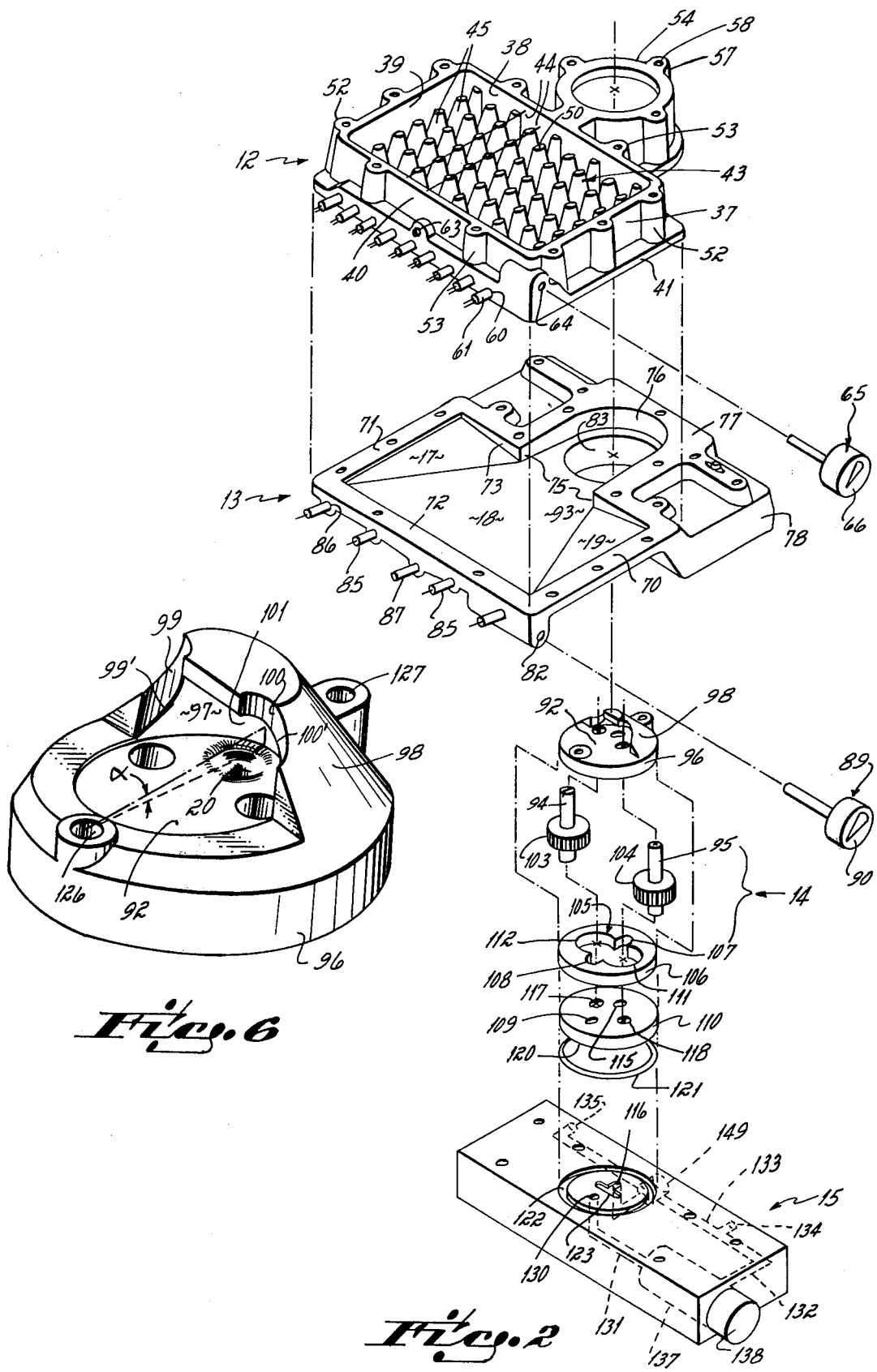
FIG. 2 is an exploded perspective view of a portion of the apparatus of FIG. 1.

Referring first to FIGS. 1 and 2, it will be seen that the thermoplastic material melting and dispensing apparatus of this invention comprises a housing 10 within which there is located a hopper 11, a grid melter 12, a reservoir 13, a gear pump 14, and a manifold block 15. Solid thermoplastic material in the form of chunks, pellets or blocks are placed in the top of the hopper 11 from which they flow through the open bottom into contact with the top surface of the grid melter 12. The grid melter 12 is heated so that surface contact of the solid thermoplastic material with the top surface of the grid causes the solid thermoplastic material to be melted and converted to a molten state. The molten thermoplastic material then flows downwardly through bottom passageways 16 in the grid melter into the reservoir 13 located immediately beneath the melter 12. The reservoir has sloping bottom walls 17, 18 and 19 which direct the molten material toward the inlet 20 of the pump 14. The pump then moves the molten material into the manifold block 15 from whence it is directed to one or more conventional applicators or dispensers via hoses or conduits 21.

Reservoir

The reservoir 13 comprises an open top, closed bottom receptacle which is fixedly secured to the bottom of the grid melter. The reservoir has shallow side walls 70, 71 and a shallow rear wall 72. The front wall 73 is slightly deeper such that the bottom of the reservoir slopes downwardly from the front and side walls toward a front opening 75 in the front wall 73. This opening 75 functions as the entrance for molten material into a blind recess 76 formed in a pump mounting boss 77 of the reservoir. The blind recess 76 of the pump mounting boss 77 is intersected by a vertical bore 83 which extends from the bottom of the boss 77 into the recess 76. The pump 14 is located within this bore 83 and bolted to the manifold block 15.

The boss 77 has a base portion 78, the bottom flat surface of which rests atop and is supported by the manifold block 15. The manifold block in turn rests upon and is supported from the base 25 of the housing. The manifold block 15 and pump mounting boss 77 of the reservoir are secured together by bolts (not shown) which extend through and are threaded into aligned vertical bores.

In the preferred embodiment there are two electrical U-shaped resistance heaters 85 molded within the bottom walls 17, 18 and 19 of the reservoir. There is also a tube 87 molded within the bottom wall 18. A temperature sensor is inserted into the tube 87 and is utilized to control the flow of electrical current to the heaters 85 so as to maintain the bottom wall at a preset temperature. There is also a transverse bore 82 located beneath the side wall of the reservoir. This bore 82 accommodates a conventional temperature measuring gauge 89, the front face 90 of which is located on the control panel of the housing 26. The heaters 85, as shown in FIG. 2, are positioned on opposite sides of the pump 14 to insure uniform heating of the pump 14 and manifold 15.

Pump

The pump 14 has a top surface 92 which is co-planar with and forms a continuation of the sloping surface 93 of the reservoir bottom wall 18. In the preferred embodiment it slopes at an angle of approximately 5° to the horizontal plane. The slope is such that the natural flow of molten material over the bottom wall of the reservoir is toward the pump inlet 20.

One of the problems I encountered in connection with the dispensing of hot melt material from this apparatus was that of maintaining a sufficient flow of molten material into the pump 14 to match the capacity of the melter and/or the dispenser. Specifically, I found that the high viscosity of the molten material often retarded the rate of inflow of the molten adhesive into the pump with the result that the flow rate of the material into the pump limited the capacity of the system.

To overcome this problem the pump 14 comprises a novel liquid feed method and apparatus for increasing the input of high viscosity material into the pump. Specifically, it includes a pair of counter-rotating shafts 94, 95 which extend above the top surface 92 of the pump and which tend because of their rotation to force material between the two toward an overhanging rear wall 97 formed on the inside of an overhanging hood 98. The wall 97 overhangs the entrance port 20 of the pump and slopes toward the entrance port so that material contacting the wall 97 is caused to flow toward the inlet port 20 of the pump. The overhanging hood 98 also includes a pair of downwardly sloping surfaces 99, 100 which wrap around and contact or very nearly contact the peripheral surface of the counter-rotating shafts 94, 95. The lower inside edges 99', 100' of each of these sloping surfaces 99, 100 forms a spiral edge which acts as a scraper to scrape molten material adhered to the shaft from contact with it. As the material is scraped from the shaft it is forced to flow downwardly within an entrapment chamber 101 formed beneath the inclined surface 97 of the hood 98.

With reference to FIG. 6 it will be seen that as the leftwardmost shaft, the drive shaft 94 of the pump 14, is caused to rotate in a counterclockwise direction, molten material flowing toward the pump inlet 20 enters between the two shafts and at least a portion of that molten material contacts the shafts. Upon contact with the counter-rotating shafts, the molten material adheres to them and is caused to rotate with the shafts until it comes into contact with the inclined scraper edges 99', 100'. Upon contact with the scraper surfaces 99, 100 the molten material is scraped from the counter-rotating shafts and forced to flow downwardly within the entrapment chamber 101 toward the pump entrance 20. Consequently, the counter-rotating shafts and cooperating scrapers effect a forced infeed of molten material into the pump inlet 20, also disrupting the natural tendency of the formation of a vortex. Elimination or avoidance of the vortex has the effect of reducing the possibility of pump cavitation and/or introduction of air into the molten material.

The remainder of the pump, other than the end plate 96 and the associated infeed mechanism comprise a conventional commercially available gear pump. Specifically, the remainder of the pump comprises a pair of interconnected gears 103, 104 which are drivingly keyed to the drive shaft 94 and idler shaft 95. These gears rotate within a generally four leaved clover-shaped recess 105 of the gear stator 106. One "leaf" 107 of the clover-shaped opening in the stator 106 is open to communicate with the inlet port 20 and the opposite "leaf" 108 of the recess communicates with an outlet port 109 of a lower end plate 110. The other "leaves" 111 and 112 of the clover-shaped recess 105 accommodate the counter-rotating inter-engaged gears.

The lower end plate 110 includes in addition to the outlet port 109, a pressure balancing port 115 which extends through the end plate 110 and communicates with a pressure balancing port 116 of the manifold block 15. Additionally, the end plate 110 includes a pair of vertical apertures 117 and 118 which accommodate the lower ends of the shafts 94, 95 and function as bearings or journals for those lower ends. Between the bottom surface 120 of the end plate 110 and the top surface of the manifold block 15 there is a conventional O-ring 121 which fits within a semi-circular cross sectional annular ring 122 in the top surface of the manifold block. This O-ring 121 functions as a seal between the bottom surface of the reservoir 13 and the top surface of the manifold 15. Except for this seal between the manifold and the reservoir 13 there are no gaskets or seals. While leakage does occur around the periphery of the shafts 94, 95 within the pump that leakage is accommodated by permitting it to flow through a T-shaped slot 123 in the top surface of the manifold block back to the inlet or suction side of the pump.

With reference to FIG. 2 it will be seen that the T-shaped slot 123 interconnects the vertical bores 117, 118 of the lower end plate as well as the vertical port 115 of the end plate. Consequently, leakage of molten material flowing between the rotating shafts 94, 95 and the inside surface of the bores 117, 118 is simply routed through the T-shaped slot 123 back to the suction side of the pump through the connecting bore 115 of the pump end plate 110.

The pump 14 is secured to the top of the manifold block by bolts 125 which extend vertically through vertical bores 126, 127. In preferred embodiment of the pump, spacer sleeves 128, 129 are located within the bores 126, 127 between the bolts and the inner surfaces of the bores 126, 127.

Manifold Block

The manifold block 15 is ported such that the molten material flowing from the outlet port 109 of the pump flows into the vertical inlet port 130 of the manifold. This inlet port communicates with a longitudinal passage 131, a transverse passage 132, a longitudinal passage 133 on the front side of the block and outlets ports 134 and 135. Conventional dispensers, as for example conventional hot melt applicator guns or dispensers of the type shown in U.S. Pat. No. Re. 27,865 or U.S. Pat. No. 3,690,518 may be attached to the outlet ports 134, 135 of the manifold block, either directly or by conventional heated hoses. The number of outlet ports and connected dispensers will vary depending upon the particular application to which the system is applied.

Intersecting the longitudinal passageway 131 and extending coaxially with it there is a filter mounting bore 137. This bore accommodates a conventional filter, one end of which comprises a plug 138 threaded into a threaded end section 139 of the bore 137. This plug has attached to it a fluted central core 140 over the exterior of which there is a filter screen 141. A complete description of the filter assembly may be found in U.S. Pat. No. 3,224,590 which issued Dec. 21, 1965. Hot melt material flowing into the manifold block flows through the passage 131 to the exterior of the filter screen 141. It then flows through the filter 141 into the flutes 142 of the core of the filter, along the flutes 142, beneath a collar 143 and into an annular channel 145 of the manifold block which surrounds the inner end 147 of the filter plug 138. This annular passage 145 communicates with the transverse passage 132 of the manifold block and th interconnected longitudinal passage 133.

Intersecting the longitudinal passage 133 there is a one-way check valve mounting bore 149 which extends inwardly from the front surface 150 of the manifold block into communication with the pressure balancing port 116. This check valve mounting bore also intersects the longitudinal passage 133 in the front of the manifold. Threaded into the bore 149 there is a conventional pressure relief one-way check valve 152. This valve comprises a valve body 153 having a central bore 154 therein. The forwardmost end of the bore is stepped to a smaller diameter end section 155 which communciates with a transverse bore 156 of the valve body 153. There is also a transverse bore 157 which extends through the inner end of the valve body 153 and interconnects the large diameter section of the valve body bore 154 with the inner end 158 of the body mounting bore 149 and consequently with the pressure balancing port 116 of the manifold.

Mounted interiorly of the check valve body 153 there is a spring 160 which biases a check valve ball 161 into closed engagement with a shoulder 162 of the check valve.

In operation, high pressure molten material flows through the passage 133 and the outlet ports 134, 135 of the manifold block to the hot melt dispensers or applicators. In the event of excessive pressure build-up within the hoses, the dispensers or the manifold block, the high pressure condition will be relieved by opening of the ball check valve 152 and resulting flow of the high pressure molten material through the transverse passage 156 of the check valve 152, the bore 154, the transverse passage 157 and back through the passage 116 to the T-shaped slot 123 and to the inlet port of the pump. This check valve thus will always relieve any over pressure condition without any breakage or damage to the applicator equipment.

Pump Drive System

Figure 3:
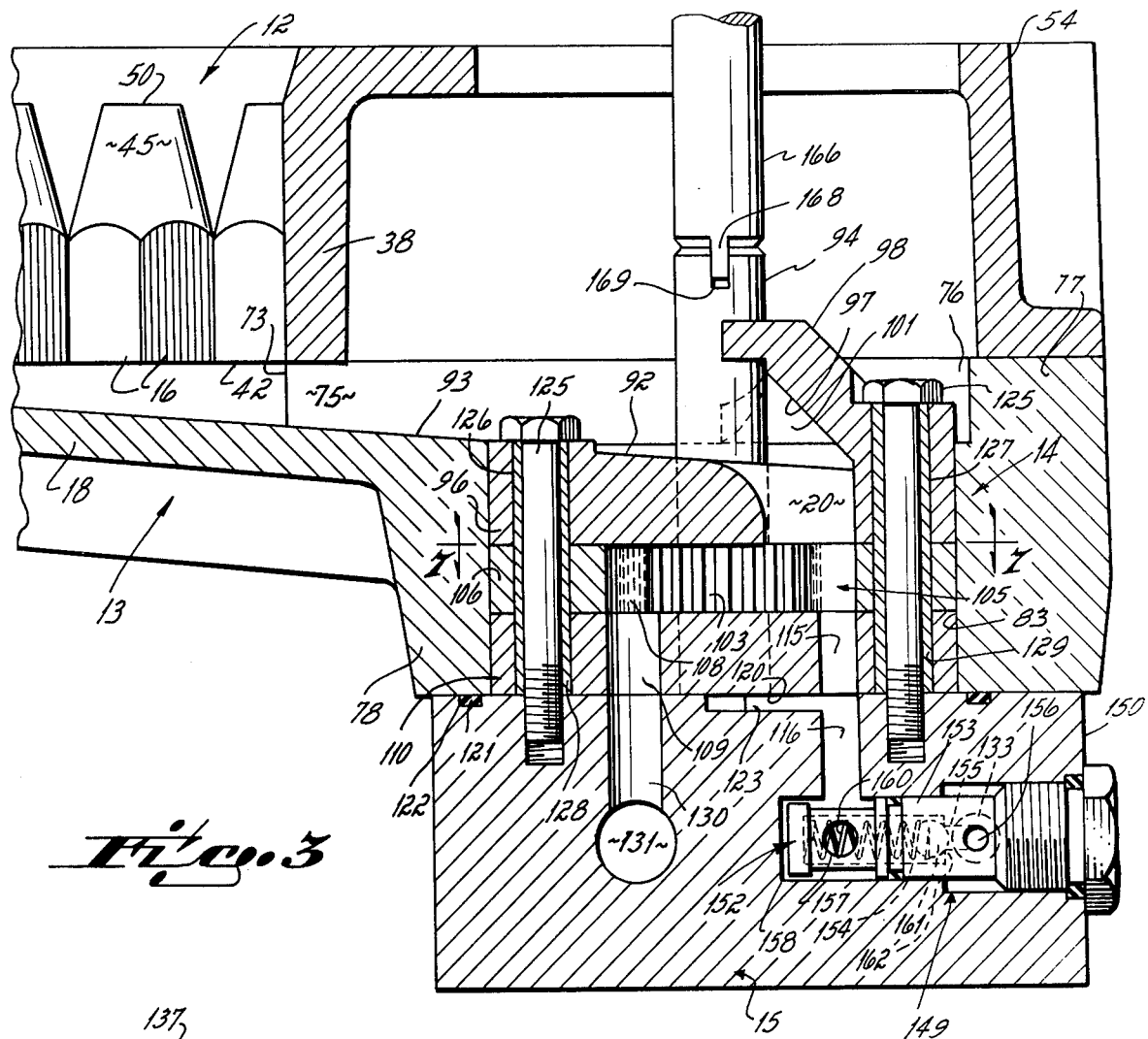
FIG. 3 is a cross sections view through the pump housing.
Figure 5:
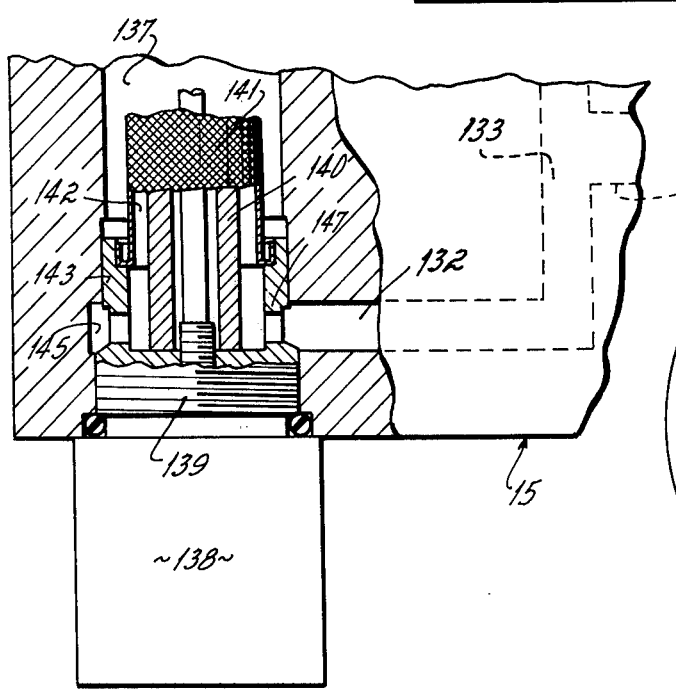
FIG. 5 is a cross sectional view through a portion of the manifold block.
Figure 4:
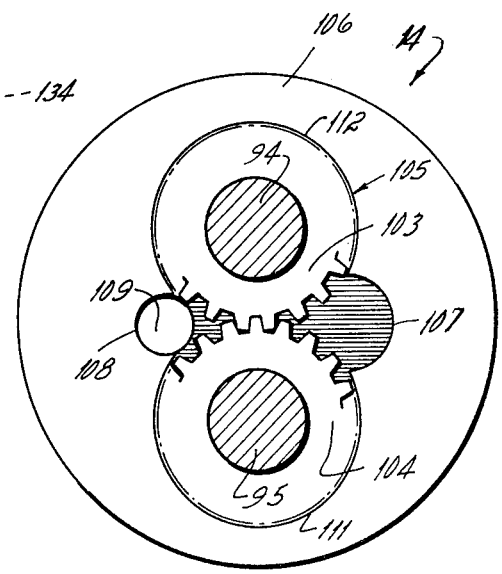
FIG. 4 is a cross sectional view through the gear pump of the apparatus.

The pump 14 may be driven in rotation by any conventional type of drive motor 165 and interconnected drive shaft 166. In the preferred embodiment illustrated in FIG. 3, the motor drive shaft has a key 168 on its outer end which fits within a key-way slot 169 at the upper end of the pump drive shaft 94. The motor is mounted atop the shroud 26 of the housing. In one preferred embodiment of the invention, the motor 165 is a rotary pneumatic motor driven by conventional shop air pressure and operative to effect rotation of the shaft 166 at a predetermined speed through a conventional gear reduction unit mounted interiorly of the motor housing.

While I have described in detail only one preferred embodiment of my improved method and apparatus for dispensing thermoplastic material, it will be appreciated that numerous changes and modifications may be made in the apparatus without departing from the spirit of my invention. Therefore, I do not intend to be limited except by the scope of the following claims.

I claim:

1. The method of pumping viscous liquid material which comprises,
    supplying the liquid material into contact with a rotating shaft to which it adheres upon contact,
    shearing said liquid material from contact with the rotating shaft by means of a shear surface located in close proximity to the peripheral surface of said shaft, said shear surface being inclined relative to the peripheral surface of said shaft,
    entrapping said liquid material as it is sheared from said shaft within an entrapment chamber, which entrapment chamber communicates with a pump inlet passage, and
    causing liquid material as it is sheared from said rotating shaft to force material contained within said entrapment chamber to exit through said pump inlet.

2. The method of claim 1 which further comprises moving said liquid material from said pump inlet into the inlet chamber of a gear pump, and
    causing said liquid material to be moved through a pump outlet by gears contained within said gear pump.

3. The method of pumping viscous liquid material which comprises,
    supplying the liquid material into contact with a pair of counter-rotating shafts to which the material adheres upon contact,
    shearing said liquid material from contact with the counter-rotating shafts by means of a surface located in close proximity to said peripheral surfaces of said shafts and inclined relative to the peripheral surfaces of said shafts, entrapping said liquid material as it is sheared from said shafts within an entrapment chamber located between said shafts, which entrapement chamber communicates with a pump inlet passage, and causing incoming liquid material as it is sheared from said rotating shafts to force material contained within said entrapment chamber to exit through said pump inlet.

4. The method of claim 3 which further comprises moving said liquid material from said pump inlet into the inlet chamber of a gear pump, and causing said liquid material to be moved through a pump outlet by means of gears secured to said shaft and located within said gear pump.

5. The method of pumping viscous liquid material which comprises, supplying the liquid material into contact with a pair of counter-rotating shafts to which the material adheres upon contact, directing said liquid material between said counter-rotating shafts and into an entrapment chamber, which entrapment chamber communicates with a pump inlet passage, causing incoming liquid material as it is moved by said counter-rotating shafts into said chamber to force liquid material contained within said entrapment chamber to exit through said pump inlet.

6. The method of claim 5 which further comprises moving said liquid material from said pump inlet into the inlet chamber of a gear pump, and causing said liquid material to be moved through a pump outlet by means of rotating gears secured to said shafts and located within said gear pump.

7. Apparatus for pumping viscous liquid material, which apparatus comprises, a pump having an inlet, an outlet and a rotatable drive shaft, means for supplying the liquid material into contact with said rotatable drive shaft, means for shearing said liquid material from contact with the rotating shaft and for directing it into said pump inlet.

8. The apparatus of claim 7 in which said shearing and directing means includes an inclined surface located in close proximity to the peripheral surface of said shaft.

9. The apparatus of claim 8 in which said pump is a gear pump.

10. Apparatus for pumping viscous liquid material, which apparatus comprises, a pump having an inlet and outlet, a pair of counter-rotating shafts to which the material adheres upon contact, means for shearing said liquid material from contact with the counter-rotating shafts and for directing it into said pump inlet.

11. The apparatus of claim 10 in which said shearing and directing means include an inclined surface located in close proximity to said shafts.

12. The apparatus of claim 11 in which said pump is a gear pump and in which one of said shafts is a drive shaft of said gear pump.

* * * * *

UNITED STATES PATENT AND TRADEMARK OFFICE
CERTIFICATE OF CORRECTION

PATENT NO. : 4,009,974

DATED : March 1, 1977

INVENTOR(S) : Charles H. Scholl

It is certified that error appears in the above-identified patent and that said Letters Patent are hereby corrected as shown below:

Col. 1, line 16, "is" should be -- in --

Col. 1, line 30, "thus" should be -- this --

Col. 2, line 5, "roating" should be -- rotating --

Col. 2, line 32, "sections" should be -- sectional --

Col. 4, line 7, insert after "direction" -- and the idler shaft is caused to rotate in a clockwise direction --

Signed and Sealed this

Third Day of May 1977

[SEAL]

Attest:

RUTH C. MASON
Attesting Officer

C. MARSHALL DANN
Commissioner of Patents and Trademarks